United States Patent [19]

Rüther

[11] 4,410,292
[45] Oct. 18, 1983

[54] DEVICE FOR RETAINING AND HOLDING A PLATE OR PANEL IN AN ARTICLE OF FURNITURE OR THE LIKE

[76] Inventor: Hubert Rüther, Elbring 25, Seevetal 8 bei Hamburg, Fed. Rep. of Germany, D-2105

[21] Appl. No.: 221,464

[22] Filed: Dec. 30, 1980

[30] Foreign Application Priority Data

Feb. 1, 1980 [DE] Fed. Rep. of Germany ... 8002638[U]

[51] Int. Cl.³ .............................................. F16D 1/00
[52] U.S. Cl. .................................... 403/24; 403/408; 403/295
[58] Field of Search ................. 403/408, 295, 292, 24; 24/221 R, 221 A

[56] References Cited

U.S. PATENT DOCUMENTS

| 2,373,722 | 4/1945 | Von Opel | 24/221 A |
| 2,624,588 | 1/1953 | Jones | 403/292 X |
| 4,082,470 | 4/1978 | Alberts | 403/295 X |

FOREIGN PATENT DOCUMENTS 7065 1/1980 European Pat. Off ............. 403/292

*Primary Examiner*—Andrew V. Kundrat
*Attorney, Agent, or Firm*—Martin A. Farber

[57] ABSTRACT

A toggle for use in an article of furniture or the like including a panel and a frame of pipes detachably interconnected by means of substantially tubular connector sockets substantially concentrically mounted with respect to an end of at least one pipe, the wall of each connector socket and the wall of the pipe end being provided with alignable, non-circular openings, said toggle comprising a rotary head, a rotary latch, and a shank section connecting the head and the latch, said toggle adapted to secure the panel to the frame by extending through the aligned, non-circular openings of the connector socket wall and the pipe end wall such that the rotary latch engages the inner surface of the innermost wall in force-locked manner and the shank section engages the innermost wall opening edge in form-locked manner, the edge of the rotary head adjacent to the shank section being substantially planar for supporting and securing the panel.

6 Claims, 7 Drawing Figures

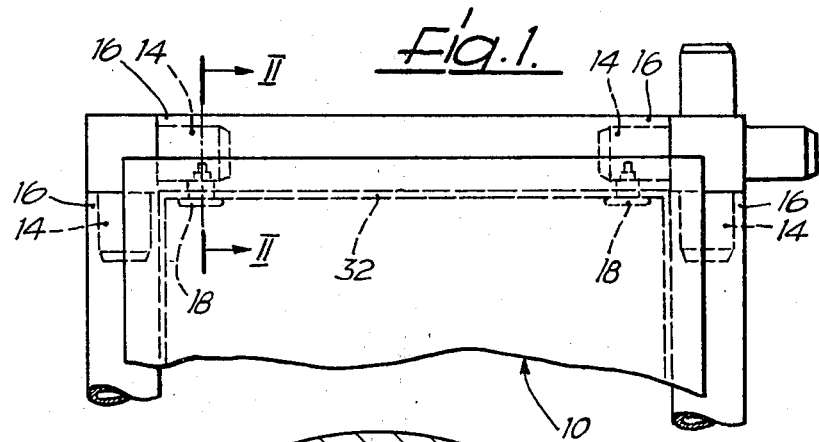
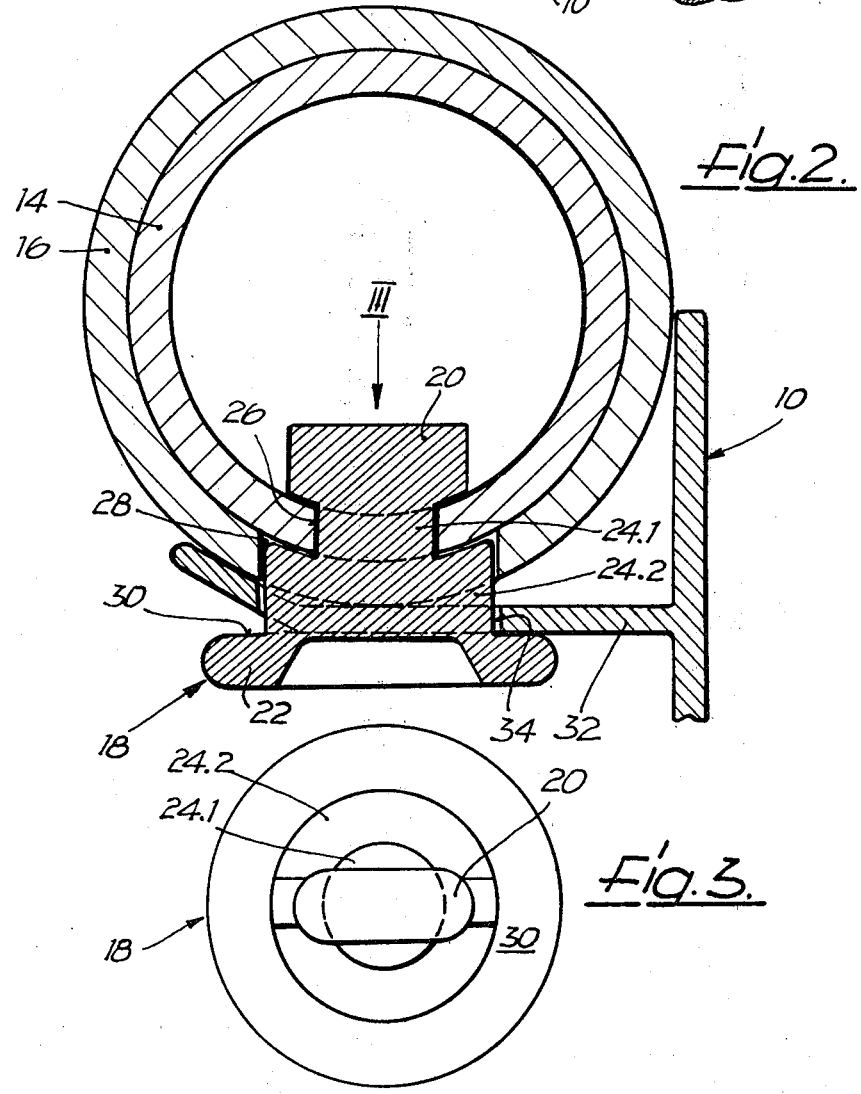
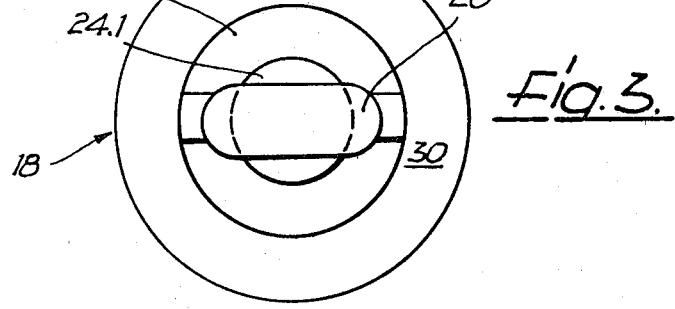

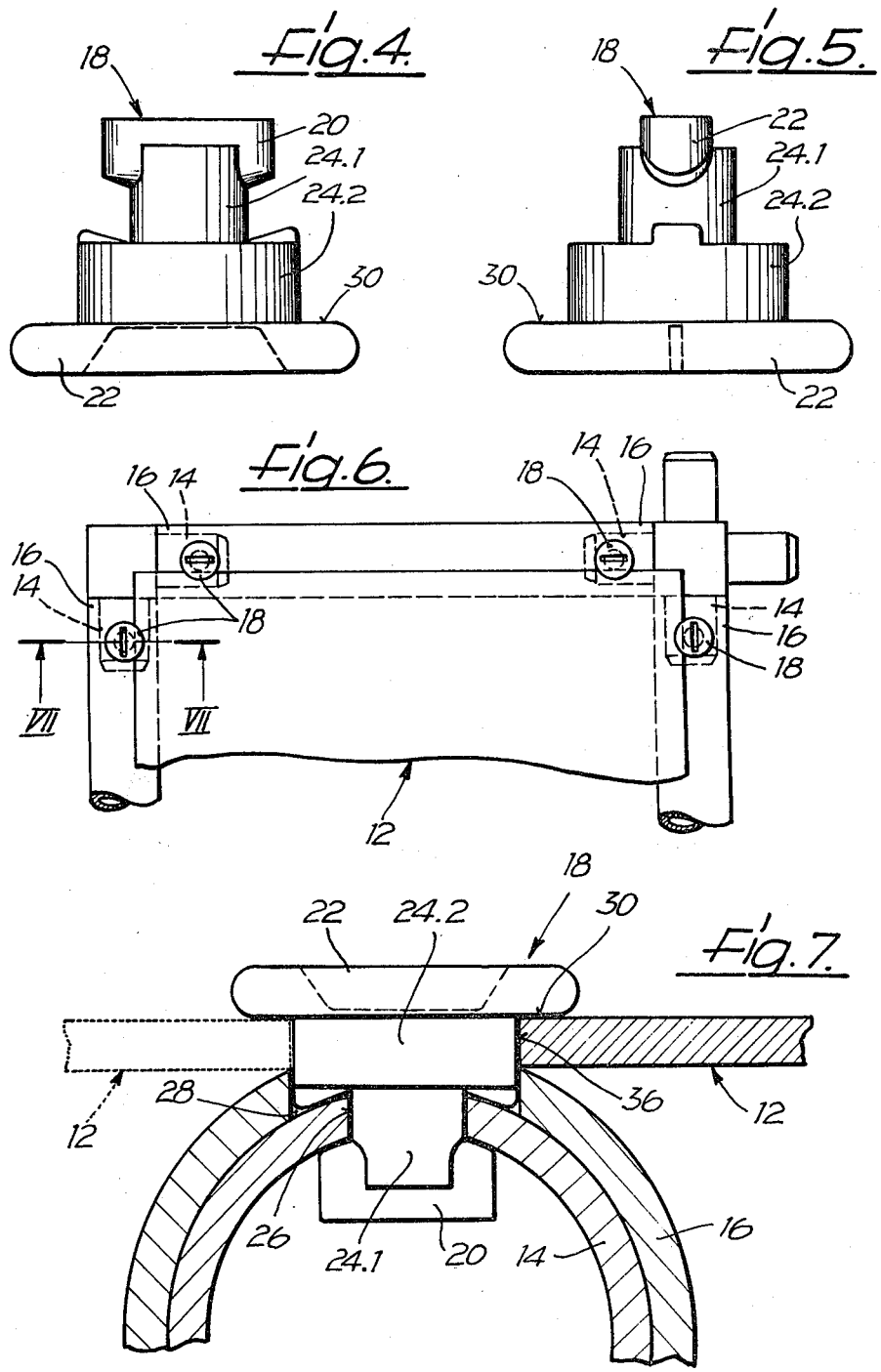

DEVICE FOR RETAINING AND HOLDING A PLATE OR PANEL IN AN ARTICLE OF FURNITURE OR THE LIKE

The present invention relates to a device for retaining and holding panels of articles of display or furniture or game or sport apparatus on connecting pipes of the article of furniture or apparatus. The retaining and holding device is adapted for use with a frame for supporting the panel comprising a plurality of interconnecting pipes detachably connected to each other by a plug connector having a socket section for insertion into a pipe end. The plug connector socket and the pipe end are provided with coinciding wall openings of non-circular shape. The retaining and holding device includes a self-locking toggle including a rotary head, a rotary latch, and a shank section connecting the head and the latch. The rotary latch is adapted to be insertable through the wall openings at a certain orientation and is adapted to engage in force locked manner the inside surface of the inner wall upon a slight rotation of the retaining and holding device after insertion of the rotary latch through the wall openings. The shank section is adapted to engage the wall opening edges in form-locked manner upon such slight rotation of the retaining and holding device.

Plug connections for connecting pipes and plug connectors which are secured axially and against rotation by toggles are known from the applicant's own West German Utility Model No. 7,820,267.

In the applicant's own EU-OS No. 00 07 071, a device of the above-mentioned type was for the first time proposed. There, the panel is provided with at least two clamping rails arranged on the same surface, but near opposite ends, of the panel and extending perpendicular thereto. The rails comprise flat ledges each having an edge remote from the panel which is bent towards the edge of the panel and each having at its two ends an opening for the panel securing device described therein. Such securing device is provided with a toggle shank of circular cylindrical shape. There it was proposed to provide each of the clamping rails at their two ends with an opening and to provide each of the turn heads of the toggles with at least one locking body which extends through an opening in the clamping rail and engages in locking fashion behind the edge of said opening. In this manner clamping of the panels is secure even if the panels are heavily loaded on the surface thereof having the clamping rails.

Differing from the device disclosed in EU-OS No. 00 07 071, there is proposed, for the same purpose, an improved device of the aforementioned type which is characterized by the fact that the rotary head of each toggle is developed flat on the lower-side thereof which faces the rotary latch for application against the flat outer edge of a panel corner. In this way the result is more advantageously obtained that panels which are entirely flat on both sides and therefore plane-parallel can be secured at each of their four corners without clamping rails or connection rails by means of two toggles such that the two side edges of the panel corner which are perpendicular to each other are each brought to rest against a toggle shank whose axial length is so dimensioned that the inside distance between the bottom of the rotary head of the toggle and the outside surface of a pipe, corresponds to the thickness of the panel. In such case a play-free gripping of the edge of the panel is possible. The shanks of the toggles for the device in accordance with the invention must therefore not only extend through the radially inner one of the overlapping wall openings of each plug unit as in the case of the toggles disclosed in West German Utility Model No. 7,802,267, but they must also extends through the radially outer opening thereof and must in addition protrude out of the plug unit so that the desired space to receive the edge of a panel corner is provided between the pipe and the rotary head of the toggle.

In one embodiment of the invention panels may be placed adjacent to each other with a smooth joinder of the panel edges. Each of the panels has a semi-circular recess in the edge thereof near the corner thereof corresponding to semi-circular shape of the cylindrically shaped toggle shank. When the recesses of adjacent panels are placed about the toggle shank, the panel edges smoothly align in contact along the non-recessed portion of their edges.

In one device in accordance with the invention for use with panels having clamping rails, the cross sectional shapes of the ledge openings of the clamping rails and of the toggle shanks correspond and the thickness of the edge of the ledge openings on the one hand and the clearance between the rotary head and the rotary latch on the toggles, reduced by the total wall thickness of a plug unit, on the other hand, are approximately equal to each other. The toggle as described above may be used either to clamp the edge of a panel or to attach in a form-locked manner to the clamping rail of a panel.

The invention will now be described with reference to two embodiments shown by way of example in the accompanying drawings, in which:

FIG. 1 is a fragmentary top view of a piece of furniture or the like having a panel secured to a frame of interconnecting pipes by means of the retaining and holding device of the present invention;

FIG. 2 is a cross sectional view taken along line II—II of the piece of furniture or the like shown in FIG. 1;

FIG. 3 is a schematic representation of a top view of the retaining and holding device as taken in the direction of arrow III of FIG. 2;

FIG. 4 and FIG. 5 are side views, taken 90° apart, of a retaining and fastening device according to the present invention;

FIG. 6 is a fragmentary top view of another piece of furniture or the like having a panel secured to a frame of interconnecting pipes by means of the retaining and holding device of the present invention; and FIG. 7 is a fragmentary cross sectional view taken along line VII—VII of the piece of furniture or the like shown in FIG. 6.

Both fastening devices may be utilized to fasten a rectangular panel 10 or 12 respectively of a piece of furniture or other article to a substantially planar quadrilateral frame thereof, only approximately half of which is shown in FIGS. 1 and 6. The fastening device includes four plug connectors with sockets 14 seated in the corners of the frame and four connecting pipes forming the sides of the frame, the ends 16 of said pipes being placed about the connector sockets 14. In order to secure each plug connection, each plug unit 14-16 consisting of a connector socket 14 and a pipe end 16 is provided with a toggle 18, identical in the two embodiments, which primarily comprises a turning latch 20, a turning head 22 and a stepped circular-cylindrical shank 24 which connects the latch and the head. The shank section 24.1 which is adjacent to the rotary latch 20 fits into the borehole 26 of a wall opening of the connector socket 14, which opening permits the passage therethrough of the rotary latch in a given position of rotation of the toggle 18. Similarly, the shank section 24.2 which is adjacent the rotary head 22 and whose diameter is greater than that of the shank section 24.1 fits in a wall opening developed as borehole of the pipe end 16, 28 the diameter of which is at least as great as the longest basic dimension of the rotary latch 20.

The rotary head 22 of each toggle 18 is provided on the bottom thereof facing the rotary latch 20 with an annular surface 30 concentric to the shank section 24.2, which surface is entirely flat and rests, in a manner to be described later, against the panel 10 or 12 respectively.

The first embodiment, shown in FIGS. 1 to 5, is intended and adapted to hold fast the panel 10, which is provided with at least one pair of two clamping rails 32 lying near opposite ends on the rear surface of the panel and arranged perpendicular to the plane of the panel. The clamping rods comprise flat ledges each having an edge remote from the panel bent towards the edge of the panel and partially surrounding a connecting pipe also at the ends 16 thereof, as depicted in FIG. 2. Each clamping rail 32 is provided at each of its ends with an opening in the form of a simple borehole 34 into which the shank section 24.2 of a toggle 18 fits. The annular surface 30 of the toggle 18 lies in this connection outside the edge of the ledge against the clamping rail 32, the dimensions of the toggle 18 being such that the turning head 22 and the turning latch 20 clamp the connecting socket 14, the pipe end 16 and the clamping rail 32 when the turning latch 20 is placed in transverse position as shown in FIG. 2.

The second embodiment, shown in FIGS. 3 to 7, is intended and suitable for a planar panel 12, the edge length of which corresponds to the distance between two opposite shank sections 24.2 of toggles 18 of associated plug units 14–16 which are arranged in parallel but not coaxial. Here the ring surface 30 of each toggle 18 lies against the adjacent panel edge, the narrow end surface 36 of which rests against the shank section 24.2, the dimensions of the toggle and the panel thickness being so selected that the panel edge and the plug unit 14–16 are clamped between the rotary latch 20 and the rotary head 22. In this connection the panel edge is located only between the ring surface 30 of the toggle 18 and the opposite edge of the bore 28 in the pipe end 16.

Since at each corner of the panel 12 a toggle 18 acts on each of the two panel edges forming the corner, the panel 12 is prevented from any displacement along its plane or perpendicular thereto, so that it is held fast.

I claim:

1. A panel to framework fastening device for use in an article of furniture or the like including a toggle, a panel and a frame of pipe detachably interconnected by means of substantially tubular connector sockets substantially concentrically mounted with respect to an end of at least one pipe, the wall of each connector socket and the wall of the pipe end being provided with alignable, openings the radially inner opening being non-circular, said toggle comprising a rotary head, a rotary latch, and a shank section connecting the head and the latch, said toggle securing the panel to the frame by extending through the aligned, openings of the connector socket wall and the pipe wall such that the rotary latch engages the inner surface of the innermost wall in force-locked manner and the shank section engages the innermost wall opening edge in form-locked manner, the underside of the rotary head facing the shank section being substantially planar and supporting and securing the panel.

2. The device according to claim 1 wherein the shank section near the rotary head is substantially cylindrical and adapted for engagement with the panel edge in the region of a recess in the panel edge having the shape of an arcuate portion of a circle having a radius substantially equal to the radius of the cylindrical portion of the shank section.

3. The device according to claim 1 for use in an article of furniture or the like wherein the panel is provided with at least two clamping rails disposed on the same surface and on opposite sides of the panel near an edge thereof and oriented substantially perpendicular to the panel, each rail having an edge remote from the panel bent toward the panel edge and partially around the concentrically arranged walls of a connector socket and a pipe end, each rail being provided with at least one opening alignable with the aligned openings in the walls of the connector socket and the pipe end, and wherein said toggle is adapted to secure the panel to the frame by extending through the aligned openings of the connector socket wall, the pipe end wall, and the clamping rail wall.

4. The device according to claim 2 for use in an article of furniture or the like wherein the panel is provided with at least two clamping rails disposed on the same surface and on opposite sides of the panel near an edge thereof and oriented substantially perpendicular to the panel, each rail having an edge remote from the panel bent toward the panel edge and partially around the concentrically arranged walls of a connector socket and a pipe end, each rail being provided with at least one opening alignable with the aligned openings in the walls of the connector socket and the pipe end, and wherein said toggle is adapted to secure the panel to the frame by extending through the aligned openings of the connector socket wall, the pipe end wall, and the clamping rail wall.

5. The device according to claim 1 wherein the shank section has a relatively large diametrical portion adjacent the rotary head and a relatively small diametrical portion adjacent the rotary latch.

6. The device according to claim 5 wherein the rotary latch has a predetermined length and a predetermined thickness, the length being of greater dimension than the thickness and of lesser dimension than the diameter of the relatively large diametrical shank portion.

* * * * *